(12) United States Patent
Ryan

(10) Patent No.: US 12,084,174 B2
(45) Date of Patent: Sep. 10, 2024

(54) MULTI-AXIS HYBRID AIRCRAFT

(71) Applicant: Conrad Ryan, Akron, OH (US)

(72) Inventor: Conrad Ryan, Akron, OH (US)

( * ) Notice: Subject to any disclaimer, the term of this patent is extended or adjusted under 35 U.S.C. 154(b) by 0 days.

(21) Appl. No.: 17/879,641

(22) Filed: Aug. 2, 2022

(65) Prior Publication Data

US 2023/0038458 A1    Feb. 9, 2023

Related U.S. Application Data

(60) Provisional application No. 63/229,451, filed on Aug. 4, 2021.

(51) Int. Cl.
| | |
|---|---|
| *B64C 29/00* | (2006.01) |
| *B64C 35/00* | (2006.01) |
| *B64D 27/353* | (2024.01) |
| *B64D 41/00* | (2006.01) |

(52) U.S. Cl.
CPC ........ *B64C 29/0025* (2013.01); *B64C 35/005* (2013.01); *B64D 27/353* (2024.01); *B64D 2041/005* (2013.01)

(58) Field of Classification Search
CPC ...... B64U 10/16; B64U 10/20; B64U 30/294; B64C 29/0025
See application file for complete search history.

(56) References Cited

U.S. PATENT DOCUMENTS

| | | | |
|---|---|---|---|
| 2003/0106959 A1* | 6/2003 | Fukuyama | B64C 29/0033 244/12.4 |
| 2016/0304193 A1* | 10/2016 | Marcel | B64C 27/20 |
| 2017/0158322 A1* | 6/2017 | Ragland | B64C 29/0025 |
| 2020/0247536 A1* | 8/2020 | Mokhtarian | B64U 10/25 |
| 2022/0355923 A1* | 11/2022 | Andrews | B64C 29/0008 |

* cited by examiner

*Primary Examiner* — Nicholas McFall
(74) *Attorney, Agent, or Firm* — Barry Choobin; Patent 360

(57) ABSTRACT

A multi-axis amphibious copter for flying and cruising at high speeds. The multi-axis amphibious copter includes six propulsion points i.e., four propellors oriented vertically, a coaxial rotor oriented vertically, and a mini turbine thruster on the rear of the aircraft body and configured to propel the multi-axis amphibious copter forward. The multi-axis amphibious copter can land and take off vertically from congested places and can fly at cruising speeds.

15 Claims, 6 Drawing Sheets

MULTI-AXIS HYBRID AIRCRAFT

CROSS-REFERENCE TO RELATED APPLICATIONS

This application claims priority from a U.S. Provisional Patent Appl. No. 63/229,451 filed on Aug. 4, 2021, which is incorporated herein by reference in its entirety.

FIELD OF INVENTION

The present invention relates to an aircraft, and more particularly, the present invention relates to a hybrid aircraft that includes the functionality of a man-less drone and a multi-axis rotorcraft.

BACKGROUND

The Air mode of transportation is the fastest mode of transportation available currently. Long distances can be quickly covered by airplanes. Also, the air mode of transportation is safer than other modes of transport currently available. However, the air mode of transport is mostly commercial and required people to travel to a nearby airport to board an airplane.

The introduction of flying cars is a new revolution that allows people to have their flying vehicles. However, safety and efficiency are a concern with known private aircraft. Moreover, the known transportation systems, such as cars, buses, airplanes, trains, and railways are inefficient and increasingly harmful to the environment.

A need is therefore appreciated for a safer and more efficient compact aircraft that can be used in day-to-day life.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a safer, energy-efficient, and compact aircraft.

It is another object of the present invention that the aircraft can be used in day-to-day life.

It is still another object of the present invention that the aircraft can be manned and unmanned.

It is yet another object of the present invention that the aircraft can be used as a passenger aircraft.

In one aspect, disclosed is a multi-axis amphibious copter comprising: an aircraft body; four propellers are positioned at four corners of the aircraft body; and a coaxial rotor in a center of the aircraft body, wherein the four propellers and the coaxial rotor are vertically oriented. The aircraft body is aerodynamically designed. The four propellers and the coaxial rotor are driven by one or more electric motors. The multi-axis amphibious copter further comprises a mini turbine thruster positioned on a rear of the aircraft body and configured to propel the multi-axis amphibious copter in a forward direction. The coaxial rotor is configured to tilt up and down, and swivel left and right. The coaxial rotor is covered by a flip door. The four propellers are covered by four flip doors. The multi-axis amphibious copter further comprises four landing legs. The multi-axis amphibious copter further comprises two wing flaps on opposite sides of the aircraft body. The multi-axis amphibious copter further comprises two tail flaps. The multi-axis amphibious copter further comprises a cockpit configured to accommodate one or more persons. The multi-axis amphibious copter further comprises one or more fuel cells. The multi-axis amphibious copter further comprises one or more solar panels mounted on the aircraft body, wherein the one or more solar panels are configured to recharge one or more batteries. The multi-axis amphibious copter further comprises an inbuilt gyro system operably coupled to the coaxial rotor for hovering the multi-axis amphibious copter. The multi-axis amphibious copter further comprises one or more vents in the aircraft body, wherein the one or more vents are configured to direct air from the four propellers.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Figure 1:
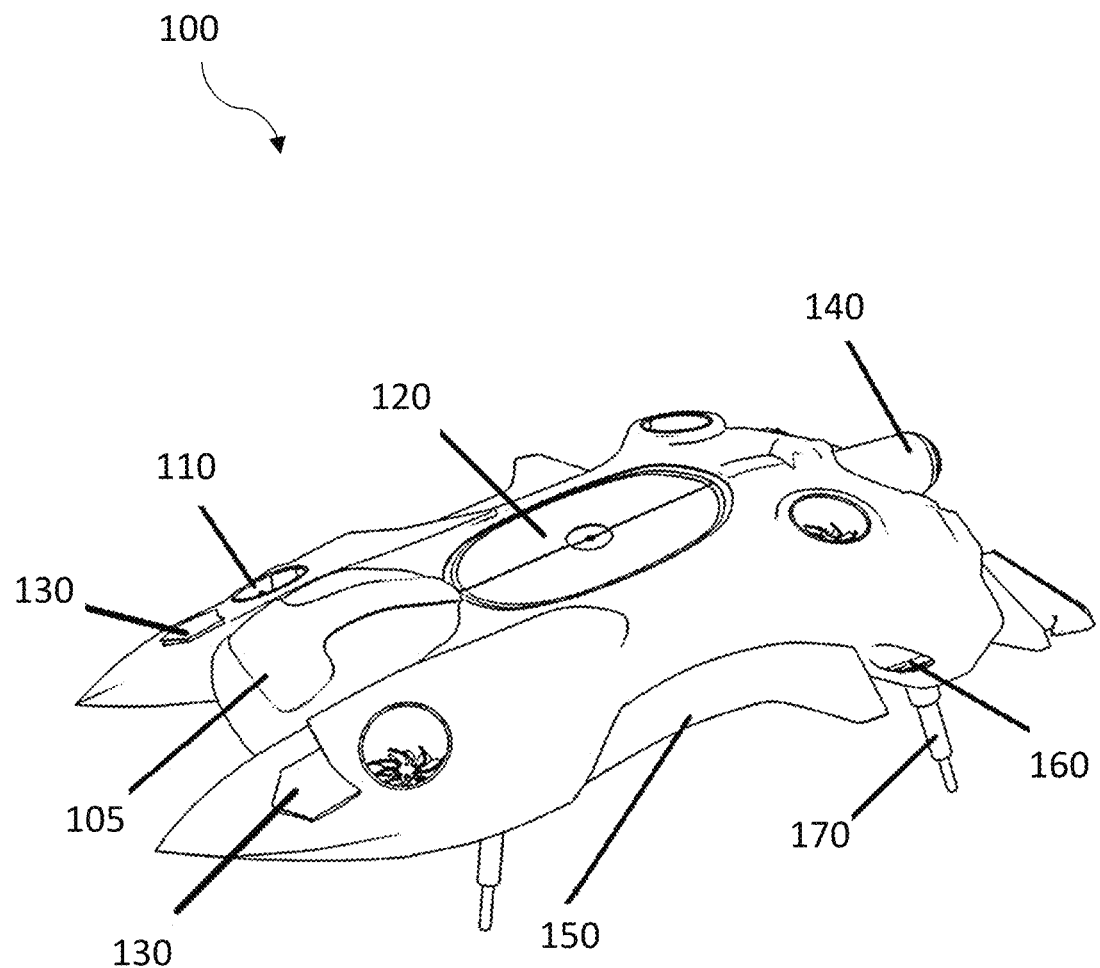
FIG. 1 is a perspective view of an aircraft, according to an exemplary embodiment of the present invention.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe particular embodiments only and is not intended to be limiting to embodiments of the invention. As used herein, the singular forms "a", "an", and "the" are intended to include the plural forms as well, unless the context indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

The following detailed description is described with reference to the drawings, wherein reference numerals are used to refer to like elements throughout. In the following description, for purposes of explanation, specific details may be outlined to provide a thorough understanding of the subject innovation. It may be evident, however, that the claimed subject matter may be practiced without these specific details. In other instances, well-known structures and apparatus are shown in block diagram form to facilitate describing the subject innovation. Moreover, the drawings may not be to scale.

Disclosed is a compact aircraft that can be used as a private flying vehicle and a passenger vehicle. The disclosed aircraft is compact and fuel efficient, and thus more environmentally friendly. The disclosed aircraft can embody the conventional and vertical take-off laws of flight coupled with modern alternative energy components and a sleek, aerodynamic surface design.

The drawbacks with smaller known aircraft can be overcome by the disclosed aircraft, such as safety. The disclosed aircraft having multiple propulsion mechanisms can be safer. The disclosed multi-axis system of the disclosed aircraft has multiple backup power propulsions and power source units to keep the aircraft air bound despite inevitable malfunctions.

The disclosed aircraft can provide a faster means of getting from one point to another. Unlike the commercial bigger airplanes, the disclosed aircraft can land and take off from congested spaces, thus can allow escaping of the traffic saving travel time and reducing pollution. The environmental pollution can be reduced significantly as the main source of energy of the disclosed aircraft is electric with minimal use of fossil fuels for propulsion, making it a cleaner form of transportation among the known methods of transportation.

In a preferred implementation, the disclosed aircraft can be amphibious and is designed to venture upon both land and water, overcoming the major restrictions of typical aircraft. The disclosed aircraft is also referred to herein as MAAC1 (Multiaxis amphibious copter).

Referring to FIGS. 1-5 which show an exemplary embodiment of the disclosed aircraft 100. The aircraft 100 can be aerodynamically shaped to merge into air pressure systems in flight for a smooth surf through the air. The aircraft can have a total of six propelling points: four electric-powered propellers 110 that are vertically oriented at the four corners of the aircraft body. Another main propulsion unit 180 can be positioned in a center of the aircraft body. The main propulsion unit 180 can be a coaxial system and a turbine jet engine 140 can be at the rear of the aircraft body. The six propulsion units and their arrangement can combine to safely lift, hold, and maneuver the craft in the air as well as on land. The main coaxial propeller at the center of the craft can tilt both up and down, as well as swivel both left and right. Its aerodynamic design allows the craft to surf and maneuver Earth's air pressure systems in all variants safely.

Figure 2:
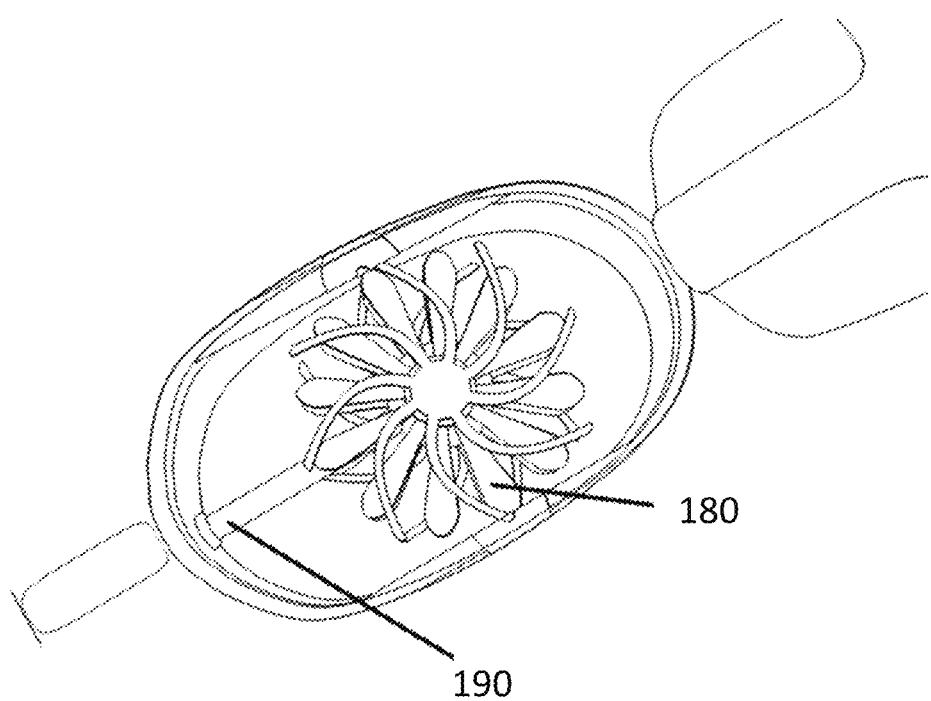
FIG. 2 shows the main coaxial rotor of the aircraft, according to an exemplary embodiment of the present invention.
Figure 3:
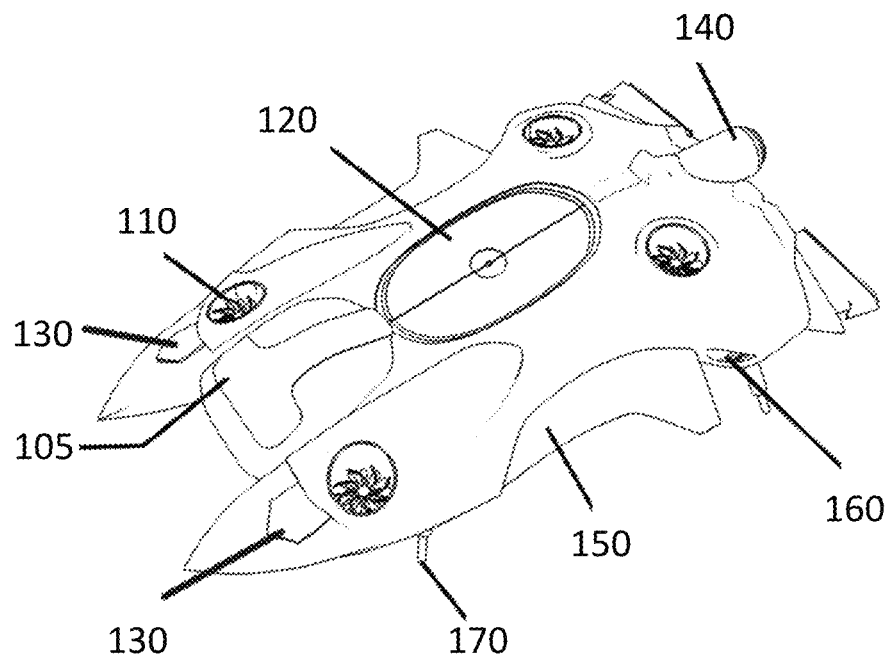
FIG. 3 is another perspective view of the aircraft, according to an exemplary embodiment of the present invention.
Figure 4:
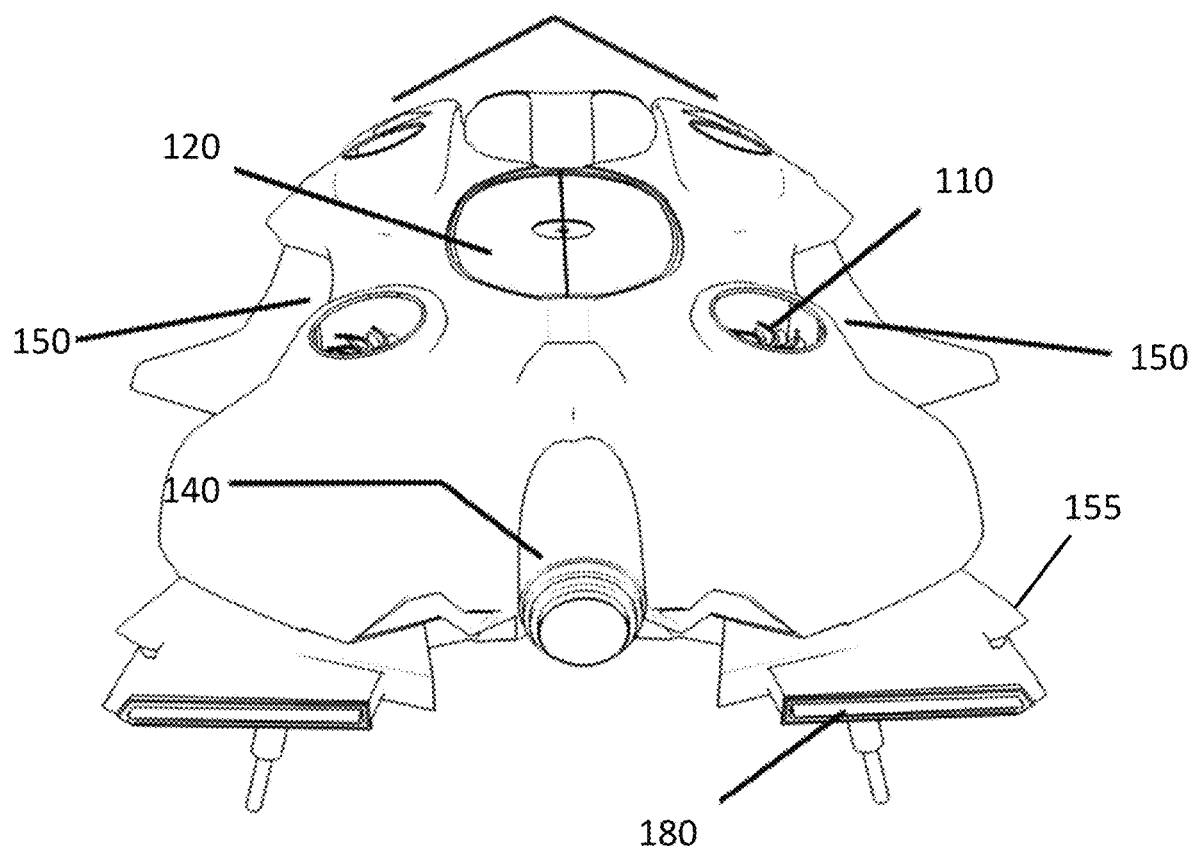
FIG. 4 is a rear perspective view of the aircraft, according to an exemplary embodiment of the present invention.
Figure 5:
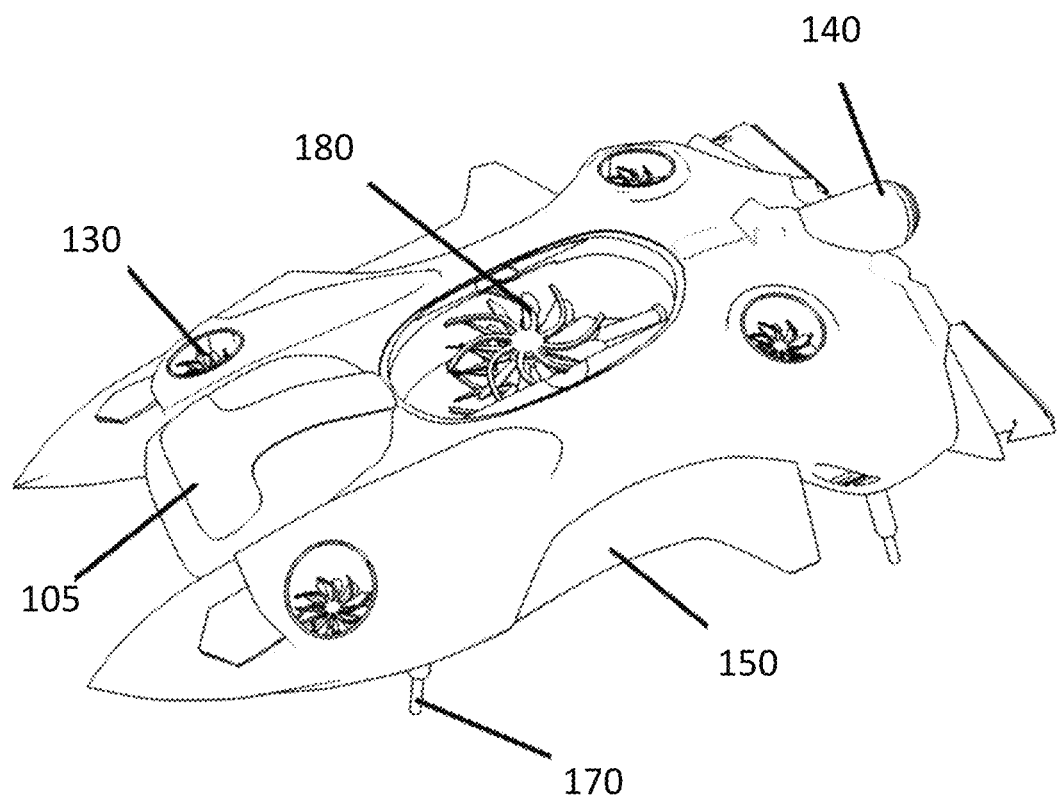
FIG. 5 is another perspective view of the aircraft, according to an exemplary embodiment of the present invention.
Figure 6:
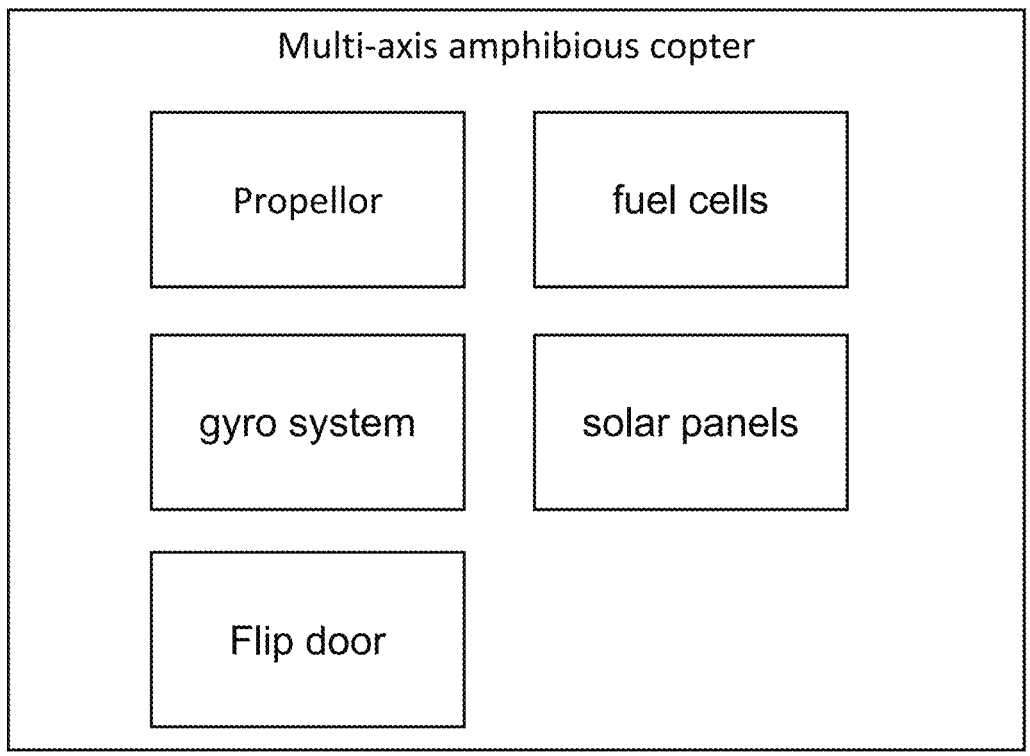
FIG. 6 is a block diagram showing features of the multi-axis amphibious copter, according to an exemplary embodiment of the present invention.

The main propulsion unit 180 can be covered by a flip door 120 that can be opened to expose the main propulsion unit 180. FIG. 2 shows a hydraulic 190 that can be used to rotate the main propulsion unit 180 as well as to tilt the main propulsion unit 180. The main propulsion unit can be a coaxial rotor.

Also, shown in the drawings are the cockpit 105, vents 130, propeller access 160, four landing legs 170, two wing flaps 150 on the opposite sides of the aircraft body, and two tail flaps 155.

The two wing flaps and the two tail flaps can assist in smooth travel by directing the disclosed aircraft and correcting inconsistencies in the air pressure.

The coaxial rotor 180 at the center of the craft is the largest and the main rotor of the disclosed aircraft. The coaxial rotor 180 can provide most of the lifting power with electricity and a shaft from a mini turbine engine. This coaxial rotor 180 is also the main unit for directing the craft, having the ability to tilt down, up, left, and right with directional rotor blades to achieve the intended lift and direction of the craft. The four propellers at the corners can work in sync with the main coaxial rotor 180 to assist in lifting, maneuvering, and landing the disclosed aircraft. As a fail-safe, the four propellers at the four corners can be engaged to balance inconsistencies in air pressure taking the craft to a safe landing. Additionally, these four propellers on an axis from vertical thrust to 180 degrees thrusting the craft forward once cruse height is achieved.

The Mini turbine thruster 140 at the rear of the aircraft can have multiple functions including pushing aircraft forward at cruise altitudes and recharging the batteries that power all the five rotors, including the main coaxial rotor at the center.

The ventilation system goes hand-in-hand with its aerodynamic design, and wing and tail flaps. Specifically, in a cruise mode, air flows through the craft allowing it to be stationed on an imaginary line of air pressure for the smoothest flight. The cockpit can be at the front of the aircraft's body. The cockpit is designed to allow a proper through-glass view of the outside of the aircraft. The cockpit can be spacious enough to accommodate around four adults, or two adults and two children. An entrance to the cockpit can be provided at the bottom of the cockpit and an emergency exit can be provided at the top of the cockpit.

The disclosed aircraft can be supported on four landing legs. The aircraft can be provided with a hydraulic system to extend and retract the landing legs for landing and takeoff. These landing legs retract and extend for the necessary application in either takeoff or landing. In the case of the craft's amphibious state, added components can be mounted to these retractable landing legs to assist in the required.

The disclosed aircraft can hover using the inbuilt gyro system, wherein the main coaxial rotor can engage with the gyro system for hovering the disclosed craft. The coaxial motor can allow the craft to sit stationary yet able to make a full 360-degree rotation in either direction right or left, with the assistance of the two rear outer propellers angling and thrusting air through the craft's rear ventilation system 160 to achieve the required direction.

The craft has included functionalities for the unmanned operation of the aircraft. For example, the aircraft can park itself without human assistance. The disclosed aircraft can include an onboard computing system that manages the different operation of the aircraft, reports any errors, receives inputs from the operator, as well as connect to external and remote devices or stations. The onboard computing system can allow for the functioning of the propulsion systems, with the failsafe reverting to the analog system, wing and tail flaps can be controlled manually in an emergency for parachutes to be deployed.

The disclosed aircraft can be provided with multiple power options to power different components with the emphasis on reducing the generation of harmful gasses and increasing energy efficiency. Fuel cells can be provided for the axillary power and also boost the electric power system of the craft. Solar panels can also be installed on the outer surface of the aircraft body to harness the solar energy which can be used to charge the batteries. The exposed surface of the aircraft can harnesses solar energy for backup power.

The propellers can be driven by electric motors which can, in turn, be powered by rechargeable batteries. The turbine engine can be powered by fossil fuel and optionally a hybrid combination with the electric motor. The turbine engine can also provide for charging the batteries.

The four propellers at the corners and the main coaxial rotor can be provided with flip doors, FIG. 1 shows the flip door 120 for the main coaxial rotor. At higher than usual altitude, a cruise mode can be engaged by closing these flip doors/mechanical irises. Mechanical irises helps with the compression of air thorough the ventilation system for a more speedy efficient travel.

For maneuvering the disclosed aircraft, the duct fan propellers can tilt left, right, and invert at times to assist the main coaxial rotor in correcting air pressure anomalies. This is achieved as sensors detect inconsistencies in air pressure allowing for axis changes to correct balance in flight. The main coaxial rotors are mainly electric with an analog fail-safe through a shaft that is driven by engaging the turbine which can be control manual and otherwise.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A multi-axis amphibious copter comprising:
   an aircraft body, wherein the aircraft body is aerodynamically designed;
   a cockpit configured to accommodate one or more persons;
   four propellers, wherein the four propellers are positioned at four corners of the aircraft body, wherein front two propellers of the four propellers are sidewards to the cockpit;
   a coaxial rotor in a center of the aircraft body, wherein the four propellers and the coaxial rotor are vertically oriented, wherein the cockpit is positioned forward of the coaxial rotor; and
   a turbine thruster positioned on a rear of the aircraft body and configured to propel the multi-axis amphibious copter in a forward direction, wherein the cockpit, the coaxial rotor, and the turbine thruster are positioned along a longitudinal axis.

2. The multi-axis amphibious copter according to claim 1, wherein the four propellers and the coaxial rotor are driven by one or more electric motors.

3. The multi-axis amphibious copter according to claim 1, wherein the coaxial rotor is configured to tilt up and down, and swivel left and right.

4. The multi-axis amphibious copter according to claim 3, wherein the coaxial rotor is covered by a flip door.

5. The multi-axis amphibious copter according to claim 4, wherein the four propellers are covered by four flip doors.

6. The multi-axis amphibious copter according to claim 5, wherein the multi-axis amphibious copter further comprises:
   four landing legs.

7. The multi-axis amphibious copter according to claim 6, wherein the multi-axis amphibious copter further comprises:
   two wing flaps on opposite sides of the aircraft body, wherein the two wing flaps are configured to be controlled manually.

8. The multi-axis amphibious copter according to claim 7, wherein the multi-axis amphibious copter further comprises:
   two tail flaps, wherein the two tail flaps are configured to be controlled manually.

9. The multi-axis amphibious copter according to claim 8, wherein the multi-axis amphibious copter further comprises:
   one or more fuel cells.

10. The multi-axis amphibious copter according to claim 9, wherein the multi-axis amphibious copter further comprises:
    one or more solar panels mounted on the aircraft body, wherein the one or more solar panels are configured to recharge one or more batteries.

11. The multi-axis amphibious copter according to claim 10, wherein the multi-axis amphibious copter further comprises:
    an inbuilt gyro system operably coupled to the coaxial rotor for hovering the multi-axis amphibious copter.

12. The multi-axis amphibious copter according to claim 11, wherein the multi-axis amphibious copter further comprises:
    one or more vents in the aircraft body, wherein the one or more vents are configured to direct air from the four propellers.

13. The multi-axis amphibious copter according to claim 1, wherein the cockpit has an entrance at a bottom thereof and an exit a top thereof.

14. The multi-axis amphibious copter according to claim 1, wherein the coaxial motor and two rear propellers of the four propellers are configured to rotate the multi-axis amphibious copter 360 degrees without horizontal movement.

15. The multi-axis amphibious copter according to claim 1, wherein the four propellers are configured to tilt left, right, and invert at times to assist the coaxial rotor in correcting air pressure anomalies, wherein the air pressure anomalies are detected by sensors.

* * * * *